April 16, 1968   R. W. COSTIN   3,378,300
VERTICALLY ADJUSTABLE SEAT BACK ASSEMBLY
Filed Dec. 7, 1966   3 Sheets-Sheet 1

INVENTOR
Robert W. Costin
BY Merriam, Marshall, Shapiro & Klose
ATTORNEYS

April 16, 1968  R. W. COSTIN  3,378,300
VERTICALLY ADJUSTABLE SEAT BACK ASSEMBLY
Filed Dec. 7, 1966  3 Sheets-Sheet 2
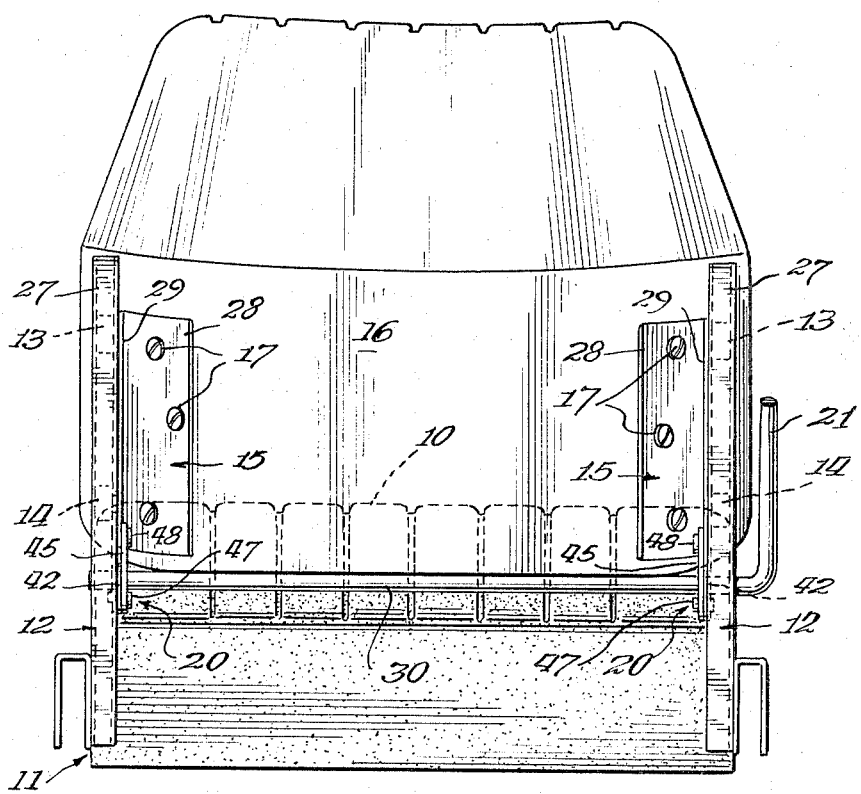
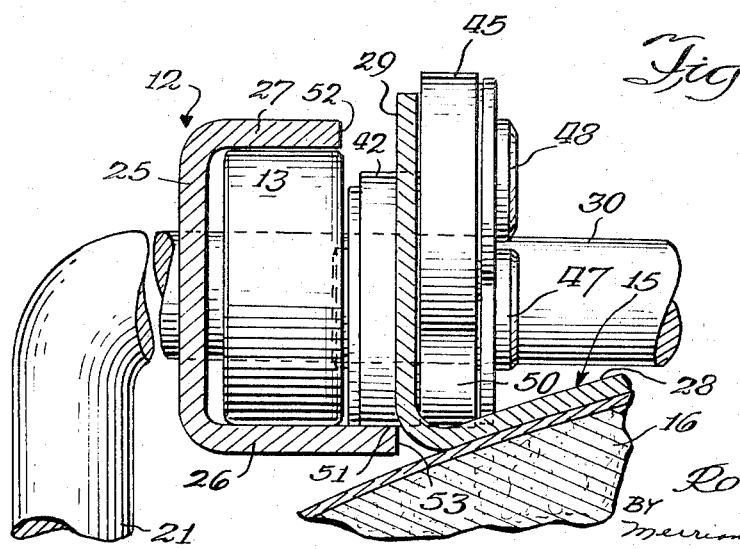
INVENTOR
Robert W. Costin
ATTORNEYS

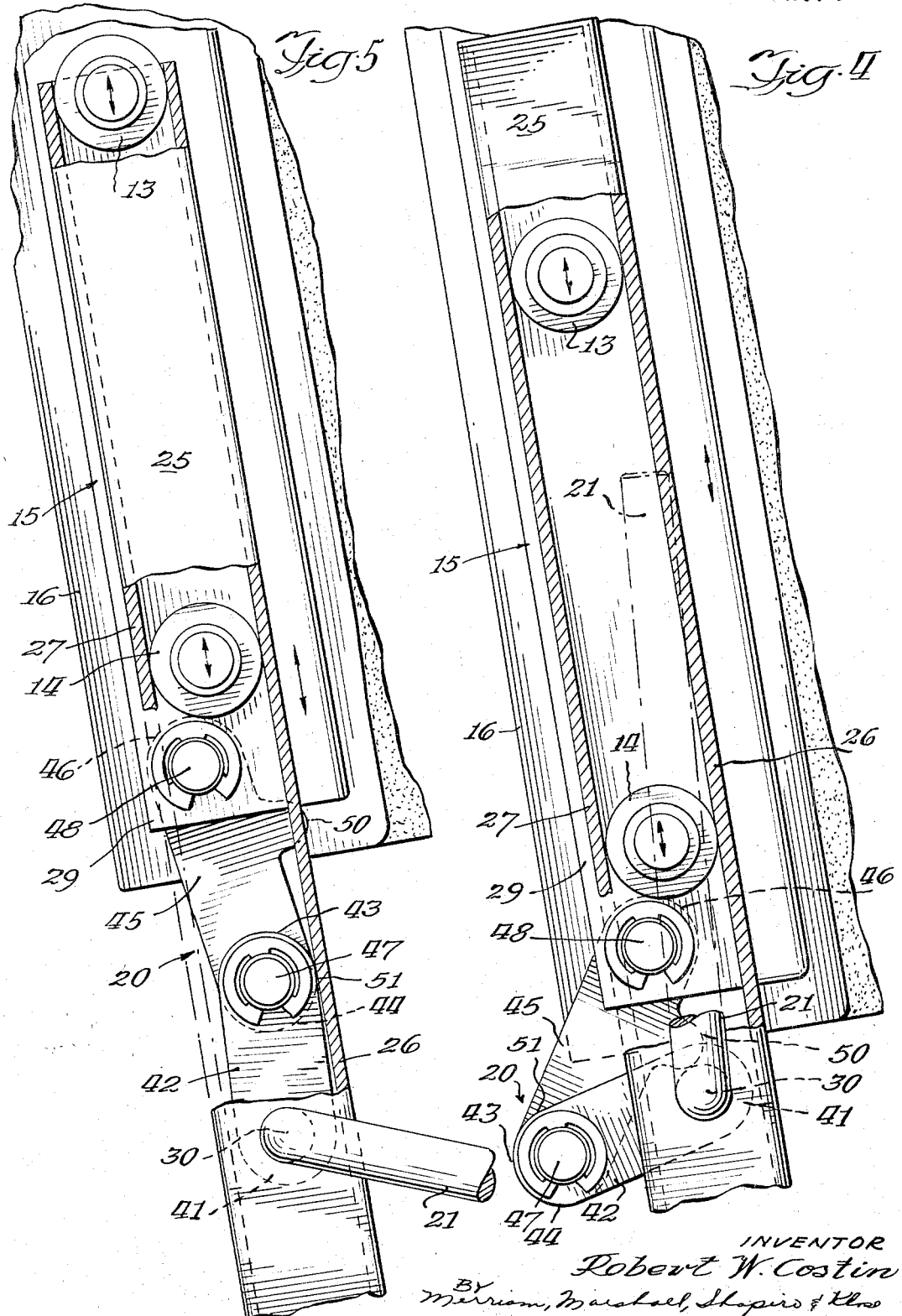

United States Patent Office 3,378,300
Patented Apr. 16, 1968

3,378,300
VERTICALLY ADJUSTABLE SEAT BACK ASSEMBLY
Robert W. Costin, Clawson, Mich., assignor to Coach and Car Equipment Corporation, Elk Grove Village, Ill., a corporation of Illinois
Filed Dec. 7, 1966, Ser. No. 599,771
11 Claims. (Cl. 297—357)

ABSTRACT OF THE DISCLOSURE

A seat back is vertically movable relative to a seat cushion. Rollers on the back ride on vertical guide members. An extendable-retractable linkage is operated by a handle to move the seat back. A pair of pivotally connected links pivot in respective opposite senses during extension and retraction of the linkage. Stops engage the links to limit pivotal movement. When the links are extended, the seat back is in its upper position. The weight of the seat back urges an extended link against an upper stop to prevent retraction of the linkage.

---

The present invention relates generally to vertically adjustable seat back assemblies. More particularly, the invention relates to an adjustable seat back assembly including a vertically disposed back member mounted for vertical movement between upper and lower positions. The assembly also includes a pair of extendable-retractable linkages mounted for movement between upper extended and lower retracted positions thereof. The back member is movable between its upper and lower positions in response to corresponding movement of the linkage. A feature of the assembly is structure which utilizes the downward gravitational urging of the back member, and of an attached back support for the occupant of the seat, to maintain the linkage in its upper position. As a result, the seat back assembly is maintained in an upper position by its own downward gravitational urging.

Other features and advantages are inherent in the structure claimed and disclosed or will become apparent to those skilled in the art from the following detailed description in conjunction with the accompanying diagrammatic drawings wherein:

FIGURE 3 is a rear view of the assembly;

FIGURE 4 is a fragmentary side elevational view, partially in section and partially cut away, illustrating the vertically adjustable seat back assembly in a lower position;

FIGURE 5 is a fragmentary side elevational view, partially in section and partially cut away, illustrating the assembly in an upper position; and FIGURE 6 is an enlarged fragmentary plan view, partially in section, illustrating the linkage of the assembly when the linkage is in an upper position.

Figure 1:
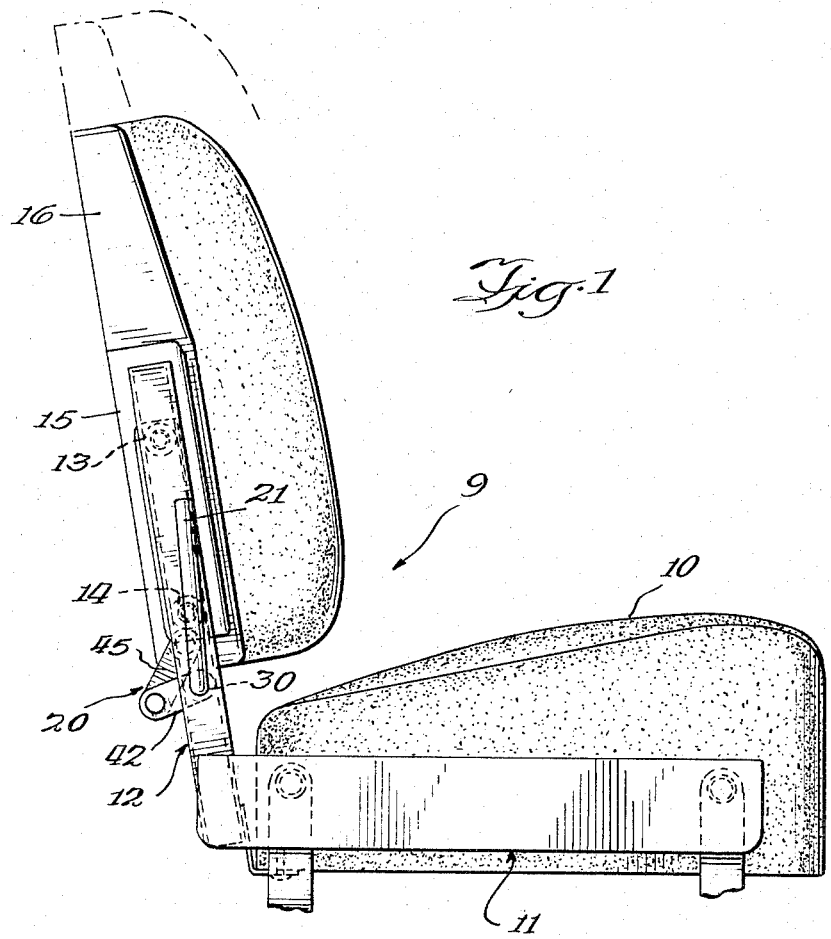
FIGURE 1 is a side elevational view of a seat including an embodiment of a vertically adjustable seat back assembly constructed in accordance with the present invention.

Referring initially to FIGURES 1 and 3, there is indicated generally, at 9, a seat having an embodiment of a vertically adjustable seat back assembly constructed in accordance with the present invention. Seat 9 includes a cushion 10 mounted on a support 11. Extending upwardly from support 11 are a pair of channel-shaped members 12 constituting guide means for pairs of upper and lower rollers 13, 13 and 14, 14 respectively. Each roller 13, 14 is mounted on a vertically disposed back member 15 connected, by screws 17, to a back support 16 for an occupant of seat 9. Rollers 13, 14 mount back members 15 and back support 16 for vertical movement relative to posts 12, between upper and lower positions for back members 15 and back support 16.

Located alongside each guide member 12 is one of a pair of extendable-retractable linkages, each indicated generally at 20, and each having opposite ends connected to a respective guide member 12 and to a respective back member 15. Each linkage 20 is mounted for movement between an upper extended position, illustrated in FIGURE 5, and a lower retracted position, illustrated in FIGURE 4. Because of the connection of a linkage 20 to a back member 15, movement of a linkage 20 between its lower and its upper position causes corresponding movement of the back member 15 and of the attached back support 16. Movement of a linkage 20 is actuated by manipulation of a handle 21 located for grasping by an occupant of seat 9.

The vertically adjustable seat back assembly will now be described in greater detail.

Referring to FIGURES 4-6, each guide member 12 has a channel-like configuration including a web 25, a first flange 26 and a second flange 27, with both flange portions 26, 27 being substantially parallel. Rollers 13, 14 engage flange portions 26, 27 during vertical movement of back member 15. Flange portions 26, 27 extend angularly upwardly to define the path of movement for back support 16 during vertical adjustment of the seat back assembly.

Figure 2:
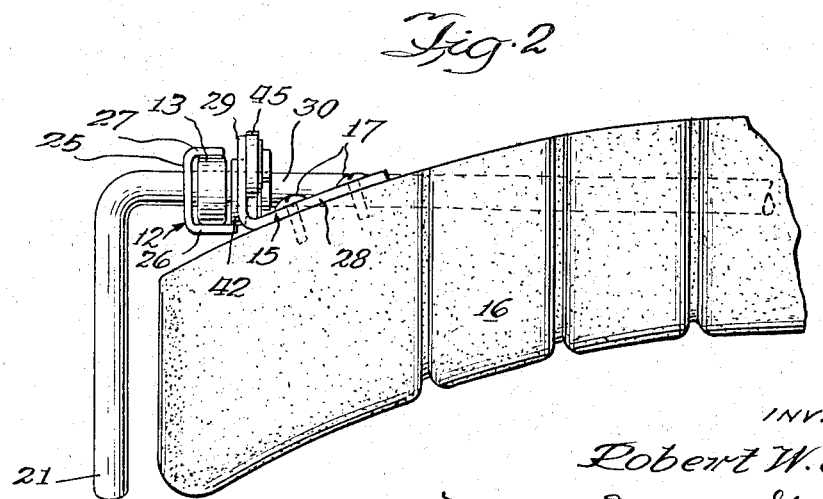
FIGURE 2 is a fragmentary top view of the assembly of FIGURE 1.

As shown in FIGURES 2, 3 and 6, back member 15 is a bracket having a first portion 28 mounted flush with back support 16 and a second portion 29 extending outwardly from portion 28 and back support 16. Rollers 13, 14 are connected to the second bracket portion 29 and are mounted for rotation about an axis extending transversely to bracket second portion 29.

Integral with handle 21 is a rotatable shaft 30 journaled between guide members 12, 12 (FIGURE 3).

Referring to FIGURES 4-6, each linkage 20 includes a first link member 42 having one end 41 fixed on shaft 30 to rotate therewith. Each link member 42 also includes another end 43, extending radially from the one end 41, pivotally connected at 47 to the first end 44 of a second link member 45 having a second end 46 extending radially from first end 44 and pivotally connected at 48 to second portion 29 of bracket-like back member 15.

Linkage 20 is movable between lower retracted and upper extended positions, illustrated in FIGURES 4 and 5, respectively, in response to movement of handle 21 between the upwardly extending position illustrated in FIGURE 1 (and in dash-dot lines in FIGURE 4) and the angular position illustrated in full lines in FIGURE 5. Movement of a linkage 20 between lower and upper positions (illustrated in FIGURES 4 and 5) causes corresponding movement of back member 15 (and back support 16) between corresponding lower and upper positions, illustrated in FIGURES 4 and 5, respectively, and shown in full lines and dash-dot lines, respectively, in FIGURE 1.

The assembly includes stop means for limiting or obstructing movement of a linkage 20 in upward and downward directions. More specifically, second link member 45 includes a projection 50 integral and substantially coplanar with second link member 45. When second link member 45 moves from the upper position, illustrated in FIGURE 5, toward the lower position thereof, a portion of shaft lies in the path of movement of projection 45; and when projection 45 contacts shaft 30 (FIG. 4), this prevents further downward movement of linkage 20 and of the rest of the seat back assembly.

When first link member 42 is in the upper position illustrated in FIGURE 5, an edge portion thereof, 51, engages against first flange 26 on guide member 12 (FIGS. 5 and 6); and this restricts further pivotal movement of linkage 20 and of the rest of the assembly.

The positions occupied by back member 15, back support 16 and linkage 20, illustrated in FIGURE 5, and which are determined by engagement of edge portion 51 on link member 42 with flange 26, are slightly lower than the uppermost positions achieved during movement of these components from the positions illustrated in FIGURE 4 to the positions illustrated in FIGURE 5.

The first stop means (edge portion 51 on link member 42 and flange 26 on guide member 12) limits pivotal movement of link member 42 in a clockwise sense about the axis of shaft 30. When link member 42 initially pivots in a clockwise sense, upwardly from the position illustrated in FIGURE 4, it imparts upward vertical movement to back member 15 and back support 16. This upward vertical movement of the assembly continues until the pivotal axis at 47 is on a straight line between the pivotal axis at 48 and the pivotal axis of shaft 30. Thereafter, continued pivotal movement of link member 42 in a clockwise sense causes downward movement of back member 15. In the position illustrated in FIGURE 5, link member 42 has pivoted, in a clockwise sense, slightly past a position parallel to guide member 12.

Second link member 45 is mounted for movement in a counterclockwise sense, about the pivotal connection 47 at its first end 44, to initially urge back support 16 upwardly, in response to pivotal movement of first link member 42 in a clockwise sense from its lower to its upper positions.

The second stop means (projection 45 and shaft 30) limits pivotal movement of first link member 42 in a second or counterclockwise sense, a pivotal sense opposite the sense in which it pivots when it moves from its position in FIGURE 4 to its position in FIGURE 5.

Back support 16 will not move from its upper position of FIGURE 5 to its lower position of FIGURE 4 unless the first link member 42 is urged in a counterclockwise sense from the position the latter occupies in FIGURE 5. However, when all the elements of the assembly are in the positions illustrated in FIGURE 5, the weight of back member 15 and back support 16 urges first link member 42 to rotate in a clockwise sense; but further rotation in a clockwise sense is obstructed by the engagement of edge portion 51 on link member 42 with flange 26 on guide member 12. Thus, the weight of back member 15 and back support 16 urges first link member 42 in a sense opposite that in which it must be urged in order for the assembly to move to its lower position. In other words, the gravitational urging of the back member and back support maintains the assembly in its upper position.

When second link member 45 is in the position illustrated in FIGURE 5, continued movement of the second link member in the counterclockwise sense will be in a downward direction, and the weight of the seat back urges the second link member to continue to pivot in a counterclockwise sense. However, first stop means 51, 26 and the engagement of rollers 13, 14 with flange 27 on guide member 12 cooperate to prevent pivotal movement of the second link member in a counterclockwise sense beyond the position occupied by the second link member in FIGURE 5.

Second link member 45 is mounted for movement about pivotal connection 47 in a clockwise sense in response to pivotal movement of first link member 42 in a counterclockwise sense away from flange 26 on guide member 12.

When the link members are in their lower positions, illustrated in FIGURE 4, the weight of back support 16 and back member 15 urges first link member 42 to pivot downwardly in a counterclockwise sense about shaft 30 and urges second link member 45 to pivot downwardly in a clockwise sense about pivotal connection 47; but further downward movement is prevented by the engagement of projection 50 on second link member 45 with a portion of shaft 30 and by the engagement of rollers 13, 14 with flange 27 on guide member 12.

Referring to FIGURE 6, when link members 42, 45 pivot from their lower to their upper positions, they both clear flange 27 on guide member 12, said flange having an outer edge 52 terminating somewhat shorter than the corresponding edge 53 on flange 26 so that the totality of flange 27 lies completely outside the path of movement of both link members 42, 45 during movement of the link members between their upper and lower positions. Flange 26, on the other hand, lies in the path of pivotal movement of first link member 42, so as to limit the pivotal movement of link member 42 in a clockwise sense, as previously described. However, flange 26 lies completely outside the path of movement of second link member 45, and thus does not interfere at all with the pivotal movement of link member 45.

The first stop means (edge portion 51 on first link member 42 and flange 26 on guide member 12) limits movement of the link members to first positions in which first link member 42 extends angularly from the axis of shaft 30 and second link member 45 extends angularly upwardly from its pivotal connection at 47 with the first link member. The second stop means (projection 50 on second link member 45 and shaft 30) limits movement of link members 42, 45 to second positions in which first link member 42 extends angularly from the axis of shaft 30 and second link member 45 extends angularly upwardly from its pivotal connection at 47 with first link member 42. End 43 of first link member 42 is higher when link member 42 is in its upper position of FIGURE 5 than when link member 42 is in its lower position of FIGURE 4. The two link member 42, 45 are mounted to pivot in respective opposite rotative senses along respective paths each having an upward vertical component through a major part of the movement of the link members from their lower to their upper positions. Each of the link members is mounted so as to be urged, by gravity, to pivot in respective opposite senses at both terminal positions (i.e., the positions of FIGURES 4 and 5) of the link members.

When the link members are in their upper extended positions of FIGURE 5, they define an acute angle facing to the left, as viewed in FIGURE 5. When the link members are in their lower retracted positions (FIGURE 4), they define a different acute angle facing in an opposite direction (to the right, as viewed in FIGURE 4).

The foregoing detailed description has been given for clearness of understanding only, and no unnecessary limitations should be understood therefrom, as modifications will be obvious to those skilled in the art.

What is claimed is:

1. In an adjustable seat back assembly:
substantially vertically extending guide means;
a substantially vertically disposed back member;
means, connected to said back member, mounting the latter on the guide means for vertical movement relative to the guide means, between upper and lower positions;
link means;
means connecting said link means to said guide means and to said back member and mounting the link means for movement between upper extended and lower retracted positions;
said link means having a substantially vertically disposed portion resting against a vertically extending surface of said guide means when the link means is in said upper position thereof;
said connecting means including means for moving the back member between its upper and lower positions in response to corresponding movement of the link means;
and means for maintaining said back member in its upper position when said vertically disposed portion of the link member rests against said vertically extending surface of said guide means;

said mounting means for the link means comprising means for utilizing solely the downward gravitational urging of the back member to urge said vertically disposed portion of the link means to rest against said vertically extending surface of the guide means.

2. In an adjustable seat back assembly:
vertically extending guide means;
a vertically disposed back member;
means, connected to said back member, mounting the latter on the guide means for vertical movement relative to the guide means, between upper and lower positions;
a first link member;
means connecting one end of said first link member to said guide means and mounting said first link member for pivotal movement relative to said guide means;
said first link member having another end radially spaced from said one end;
a second link member;
means pivotally connecting a first end of the second link member to said other end of said first member at a mutual pivotal connection;
said second link member having a second end radially spaced from said first end;
means pivotally connecting said second end of the second link member to said back member;
said first and second link members, said pivotal connecting means therefor and said means mounting the back member on the guide means constituting means for imparting vertical movement to said back member in response to pivotal movement of the first link member;
means for imparting said pivotal movement to said first link member;
first stop means for limiting pivotal movement of the first link member in a first sense which initially imparts upward vertical movement to said back member;
and second stop means for limiting pivotal movement of the first link member in a second sense, opposite said first sense;
said second link member being mounted for movement about its first end in said second sense, to initially urge the back member upwardly, in response to pivotal movement of the first link member in said first sense from the second to the first stop means;
said first stop means comprising means for limiting said pivotal movement of the first link member in said first sense when the first link member is in a position at which continued movement in said first sense will cause downward movement of the back member and at which the weight of the back member urges said first link member to pivot in said first sense;
said second stop means comprising means for limiting pivotal movement of the first link member in said second sense when the first link member is in a position at which the weight of the back member urges the first link member to pivot in said second sense.

3. In an adjustable seat back assembly as recited in claim 2, wherein:
said second link member is in a first position, when the first stop means limits pivotal movement of the first link member, at which continued movement of the second link member in said second sense will be in a downward direction and at which the weight of the back member urges the second link member to pivot in the second sense;
said first stop means and said means mounting the back member on the guide means cooperating to prevent movement of the second link member in the second sense beyond said first position.

4. In an adjustable seat back assembly as recited in claim 2, wherein:
said second link member is mounted for movement about its first end in said first sense in response to pivotal movement of the first link member in said second sense away from the first stop means;
said second link member is in a second position, when the second stop means limits pivotal movement of the link members, at which continued movement of the second link member in said first sense will impart downward vertical movement to the second link member and at which the weight of the back member urges the second link member to pivot in the first sense;
said second link member includes a projection thereon movable therewith;
said second stop means comprises means, fixed in the path of movement of said projection and outside the path of movement of the first link member, for obstructing pivotal movement of the second link member in said first sense beyond said second position;
said means mounting the back member on the guide means, said projection and said means fixed in the path of movement of the projection cooperating to prevent pivotal movement of the first link member in the second sense when the second link member is in its second position.

5. In an adjustable seat back assembly as recited in claim 3, wherein:
said first stop means comprises means fixed in the path of movement of the first link member and outside the path of movement of the second link member.

6. In an adjustable seat back assembly as recited in claim 2, wherein:
said first stop means comprises means for limiting movement of the link members to first positions in which the first link member extends angularly from the pivotal connection at its one end and the second link member extends angularly upwardly from its pivotal connection with the first link member;
said second stop means comprises means for limiting movement of the link members to second positions, in which the first link member extends angularly from the pivotal connection at its one end and the second link member extends angularly upwardly from its pivotal connection with the first link member;
said back member is in an upper position when the link members are in their first positions and in a lower position when the link members are in their second positions;
said other end of the first link member is higher when the first link member is in its first position than when the first link member is in its second position;
said link members are mounted to pivot in respective opposite senses along respective paths each having an upward vertical component through a major part of the movement of the link members from their second to their first positions;
and each of said link members is mounted so as to be urged, by gravity, to pivot in respective opposite senses at both of said positions of the link members.

7. In an adjustable seat back assembly as recited in claim 6, wherein:
said first and second link members define one acute angle, facing in a first direction, when the link members are in their first positions;
and the first and second members define another acute angle, facing in a second direction opposite said first direction, when the link members are in their second positions, 8. In an adjustable seat back assembly as recited in claim 2, wherein:
said second link member is mounted for movement about its first end in said first sense in response to pivotal movement of the first member in said second sense away from the first stop means;

said means connecting one end of the first link member to the guide means comprises a shaft mounted on the guide means;

said one end of the first link member is mounted on said shaft for rotation about the axis of said shaft;

said assembly includes a projection integral with said second link member and movable therewith;

and said second stop means comprises means on said shaft lying in the path of movement of said projection when the second link member pivots about its first end in said first sense.

9. In an adjustable seat assembly as recited in claim 8, wherein:

said second link member is substantially planar and said integral projection is coplanar with the second link member.

10. In an adjustable seat back assembly as recited in claim 2, wherein:

said guide means includes a vertically disposed web portion and a vertically disposed first flange portion extending from said web portion;

and said first stop means comprises means on said first flange portion lying in the path of said first link member when the latter pivots in a first sense from the second stop means.

11. In an adjustable seat back assembly as recited in claim 10, wherein:

said guide means includes a second vertically disposed flange portion extending from said web portion and substantially parallel to said first flange portion;

said mounting means for the back member includes roller means connected to the back member and engageable with each of said first and second flange portions of the guide means during vertical movement of the back member;

the totality of said second flange portion lying outside the paths of movement of both the first and second link members.

References Cited
UNITED STATES PATENTS

| | | | |
|---|---|---|---|
| 2,091,733 | 8/1937 | Hemminger et al. | 297—353 |
| 2,411,063 | 11/1946 | Scott | 297—357 |
| 2,486,716 | 11/1949 | Kuebler | 297—357 |
| 2,863,495 | 12/1958 | Kanabusch et al. | 297—353 X |
| 2,978,013 | 4/1961 | McIntyre | 297—355 |
| 2,992,855 | 7/1961 | Mohler | 297—353 |
| 3,055,706 | 9/1962 | Van Der Meer et al. | 297—358 |
| 3,291,527 | 12/1966 | Hall et al. | 297—353 |

CASMIR A. NUNBERG, *Primary Examiner.*

GLENN O. FINCH, *Assistant Examiner.*